United States Patent [19]

Maitenaz

[11] 4,018,587
[45] Apr. 19, 1977

[54] METHOD FOR PRODUCING A CURVED GLASS DIE HAVING AN ASPHERICAL POLISHED CONCAVE FACE

[75] Inventor: Bernard Maitenaz, La Varenne Saint Hilaire, France

[73] Assignee: Essilor International (Compagnie Generale d'Optique), Joinville-le-Pont, France

[22] Filed: Mar. 25, 1975

[21] Appl. No.: 562,038

[30] Foreign Application Priority Data

Mar. 29, 1974 France .............................. 74.11177

[52] U.S. Cl. ........................................ 65/17; 65/68; 65/107; 65/61; 264/1; 351/177
[51] Int. Cl.² .................. C03B 9/14; C03B 21/00; G02B 1/00; B29D 11/00
[58] Field of Search .................. 65/37, 107, 68, 61, 65/17; 264/1; 351/177

[56] References Cited
UNITED STATES PATENTS

| | | |
|---|---|---|
| 901,659 | 10/1908 | Stevens .................................. 65/37 |
| 1,619,341 | 3/1927 | Gagnon .......................... 65/107 X |
| 2,015,007 | 9/1935 | Emerson ........................... 65/37 X |
| 2,394,934 | 2/1946 | Orser et al. ....................... 65/107 X |
| 2,482,698 | 9/1949 | Tillyer ............................. 65/107 X |
| 2,890,486 | 6/1959 | Crandon ........................... 65/37 X |
| 3,297,422 | 1/1967 | Emerson et al. .................. 65/37 X |
| 3,889,431 | 6/1975 | Johnson ............................ 65/61 X |
| 3,946,982 | 3/1976 | Calkins et al. ..................... 65/37 X |

Primary Examiner—S. Leon Bashore
Assistant Examiner—Frank W. Miga
Attorney, Agent, or Firm—Young & Thompson

[57] ABSTRACT

A method of making a glass die for moulding progressive concave-convex ophthalmic lenses of organic glass, i.e. of synthetic polymeric material, which have their convex surface of aspheric shape, wherein a glass blank for the die is formed with its convex surface of aspheric shape and is then supported on a support member having a concave spherical support surface while being heated to a temperature at which the glass deforms without flowing, so that the convex surface sags to conform with the spherical support surface and the aspheric character is transferred to the concave surface.

6 Claims, 14 Drawing Figures

METHOD FOR PRODUCING A CURVED GLASS DIE HAVING AN ASPHERICAL POLISHED CONCAVE FACE

BACKGROUND OF THE INVENTION

1. Field of the Invention

The present invention relates generally to ophthalmic lenses and refers more particularly to so-called progressive lenses the power of which is variable from one point to another.

As is known, a progressive lens of this kind comprises a concave face and a convex face, and it is usually the convex face which is progressive, this face consequently having in relation to a reference spherical surface a deficiency of material or an excess of material which is characteristic of its progressiveness; mention is made of a reference spherical surface only for convenience of explanation and the localisation thereof will be understood later on.

2. Description of the Prior Art

Up to the present time progressive ophthalmic lenses have most usually been made of mineral glass, starting with a curved glass disc provided by moulding with one concave face and one convex face. By rough grinding there is obtained from a disc of this kind a rough glass or blank having geometrically well defined surfaces on its concave and convex faces. The surfaces rough ground in this manner are then improved by fine grinding. Finally, by polishing these surfaces are given the final polish which they require.

These successive operations of rough grinding, fine grinding, and polishing are well known, particularly for producing conventional ophthalmic lenses of mineral glass.

Furthermore, for the production of a progressive lens of mineral glass it has already been proposed to start with a curved glass blank having one of its faces polished and the other only rough ground, this blank being laid with its rough ground face on a shaping block of refractory material, which block is provided for this purpose with a shaped support surface, the assembly comprising the blank and the shaping block being then heated to a temperature just sufficient to enable the glass of the blank to deform without flowing and to bear against the said block.

By the process comprising this heat treatment and due to the fact that the support surface of the shaping block is carefully selected for this purpose, the final surface desired for the treated blank is thereby obtained on the polished face of the latter.

It is therefore not necessary to finish this surface by fine grinding or polishing, and only the face which originally was rough ground must then be rough ground again to the final shape and then fine ground and polished. For the application of heat treatment of this kind to a mineral glass blank intended to produce a lens whose progressive face is the convex face, the support surface of the shaping block usually used in the process described above is convex, and it possesses the progressiveness which is to be imparted to the convex face of the lens.

In the case of the production by moulding of a progressive ophthalmic lens of organic glass, i.e. of a transparent organic polymer, moulding is usually effected between two dies of curved glass or moulds having opposite one another two polished moulding faces, of which one is concave and the other convex, these dies being connected peripherally by a seal of flexible material.

For the purpose of producing progressive ophthalmic lenses of organic glass it is therefore expedient for one of these dies to bear on its polished face a replica of the progressive surface to be imparted to the crresponding face of the desired ophthalmic lens of organic glass.

As already stated above, it is preferably the convex face of a lens of this kind that should be progressive and it is therefore the moulding die or mould having a concave face which must accordingly be progressive.

If the process comprising utilising a shaping block of refractory material, placing a glass die on this shaping block, and heating the assembly to a temperature just sufficient to enable the glass of this die to deform without flowing, were then to be applied to the production of a die of the kind described in the preceding paragraph, it would be necessary to utilise a shaping block having a progressve concave surface. A concave progressive support surface of this kind is however technically difficult to obtain.

SUMMARY OF THE INVENTION

The present invention has the general object of overcoming the difficulty explained above.

According to the invention, a process for the production of a die of curved glass having an aspherical polished concave face is provided, in which, starting with a curved die blank having its concave face polished and its convex face at least rough ground, the blank is placed with its convex face on a shaping block of refractory material which for this purpose has a shaped support surface, and the assembly comprising the blank and the shaping block are heated to a temperature just sufficient for the glass of the said blank to deform without flowing, as the result of which there is obtained on the polished face of the blank the final surface desired for the latter, this process being characterised in that, for the production of a glass die suitable for use in moulding a progressive ophthalmic lens of organic glass, the starting blank has its original concave spherical face polished and an aspherical convex face which is at least rough ground, the said aspherical convex face being he homologue or complement of the desired final concave face and having substantially in relief or in recess, in relation to a reference spherical surface, the features which the final concave face should have in relief or in recess in relation to the original concave face, and the shaping block has a spherical support surface.

When the blank placed on this shaping block is deformed through the action of heat, the convex face of the blank is continuously applied against the support surface of the block, and the convex face molds itself to the spherical support surface provided on the block for this purpose, so that consequently the desired progressive aspherical surface is formed on the concave face of the blank.

With the aid of a process according to the invention it is possible, starting with a shaping block having a concave support surface, to obtain the desired progressive surface on the said polished concave face of the blank, the homologous or complementary progressive surface having previously been formed on the convex face of the said blank, on which it is more convenient to do so than on any concave surface.

A blank or die of this kind is associated with another die for the moulding of an ophthalmic lens of organic glass and the said dies may be peripherally joined together for this purpose by a seal of a flexible material. The process briefly described above advantageously promotes the use of a seal adapted to match exactly the surface of the said dies.

These dies can thus be entirely devoid of flat or spherical peripheral sealing surfaces, so that it will be possible to obtain progressive ophthalmic lenses of organic glass which can be used at full aperture.

The present invention thus facilitates the production of an ophthalmic lens of organic glass, wherein a lens of this kind is obtained by moulding between two dies having polished moulding faces disposed facing one another, one face being concave and the other convex, the said dies being connected peripherally by a seal of flexible material, this process being characterised in that in the case of a progressive ophthalmic lens the die having a concave moulding face is a die devoid of all flat or spherical peripheral joint surfaces, and conjointly a seal is used which is adapted to match exactly the surface of the said die.

DETAILED DESCRIPTION OF THE INVENTION

Figure 1:
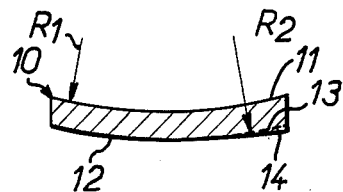
FIG. 1 is a view in axial section of a glass blank intended to form a glass die suitable for moulding a progressive ophthalmic lens of organic glass.
Figure 5:
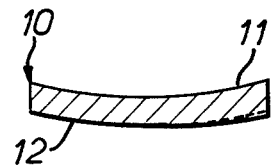
FIGS. 5 to 9 are views similar to the previous Figures and relate to an alternative embodiment.
Figure 10:
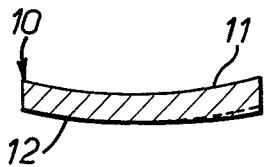
FIGS. 10 to 14 are likewise views similar to the preceding figures and relate to another alternative embodiment.
Figure 11:
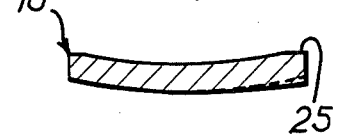

In FIG. 1 is shown a blank 10 of mineral glass, for example of the crown type, which is suitable for forming a glass die appropriate for the moulding of an ophthalmic lens of organic glass having a progressive surface on its concave face.

A blank 10 of this kind is itself in the form of a curved die having a concave face 11 and a convex face 12, produced by appropriate moulding of a glass disc whose concave face has been successively rough ground in such a manner as to give it a spherical surface of radius R1, then polished and fine ground to form the desired concave face 11 of the blank 10, while the convex face 12 has been at least rough ground, this convex face, which in FIG. 1 is seen in axial section along its central meridian, having according to the invention a progressive aspherical surface.

In the example illustrated, which relates to the moulding of a progressive lens having progressively increasing power in the direction of its bottom edge for near vision, the convex face 12 of the blank 10 has a portion 14 of increased thickness in relief in relation to a reference spherical surface 13 of radius R2.

In FIG. 1, the reference spherical surface 13 has been shown in solid lines when in itself it forms part of the convex face 12 of the blank 10, and in dashed lines when this convex face is bounded by the corresponding surface of the portion 14 of increased thickness which is provided on it.

The radii R1 and R2 may be equal to one another or different.

Figure 2:
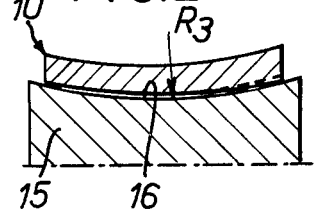
FIGS. 2 and 3 are views in axial section showing the final shaping of this blank.
Figure 6:
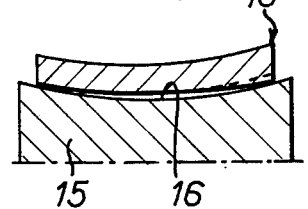
Figure 12:
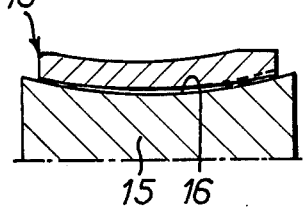

As shown in FIG. 2, the blank 10 is placed in position with its convex face 12 on a shaping block 15, which for this purpose has a concave supporting surface 16.

In the process of the invention this concave surface 16 is spherical and its radius R3 may be different from the radii R1 and R2 referred to above, or equal to either of them.

By a technique which is known per se, the assembly comprising the blank 10 and the shaping block 15 is disposed in a furnace and brought to a temperature suitable for effecting deformation of the glass of which the blank 10 is composed, but without permitting the glass to flow. This temperature obviously depends on the quality of the glass used to make the blank 10. In the case of a glass of the crown type, as mentioned above, this temperature is about 700° C.

Likewise in a manner known per se the shaping block 15 is of refractory material selected for not adhering to the glass, for example is of carborundum.

However this may be, and because of the heat treatment which is thus applied to it, the blank 10 sags so that its convex face 12 matches the surface of the support 16 of the shaping block 15, and consequently becomes spherical.

Everything thus takes place as if by a kind of transfer the excess material provided on the convex face 12 of the blank 10 in relief in relation to the reference spherical surface 13 were now situated on the concave face 11 of the blank 10, in relief in relation to the spherical surface 17 of the original concave face of the blank, taken as reference surface.

In other words, the blank 10 now has on the corresponding portion of its concave face 11 a portion 18 of increased thickness which is equivalent to the portion 14 of increased thickness which was originally provided on its convex face 12.

After the heat treatment explained above, the concave face 11 of the blank 10 has a progressive surface which is a homologue in negative of the surface desired for the lens of organic glass which is to be moulded, and since this concave face 11 has previously been polished it is directly able to effect such moulding.

Figure 4:
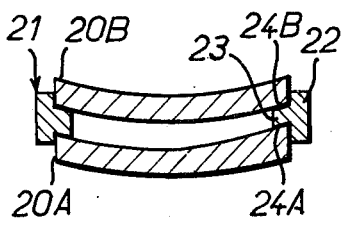
FIG. 4 is a view in axial section illustrating the moulding of the desired progressive ophthalmic lens of organic glass.
Figure 9:
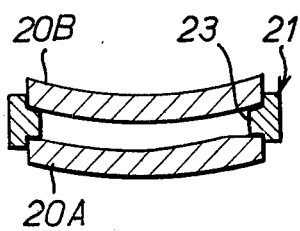
Figure 14:
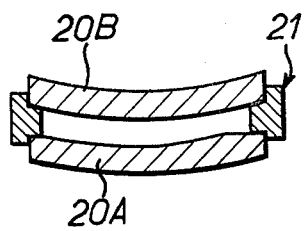

This moulding is illustrated in FIG. 4.

In accordance with a technique known per se, two moulding dies 20A, 20B, which have two polished moulding faces opposite one another, one of them being concave namely the surface provided on the die 20A in the example shown, and the other convex, namely the surface of the die 20B in the example shown, are joined peripherally by a seal 21 of flexible material adapted to hold them apart.

For this purpose, in a manner known per se, a seal of this kind has a cylindrical jointing ring 22 and, projecting from the inner periphery of the latter, a spacer lip 23 forming on each side a shoulder 24A, 24B, which shoulders are adapted to receive in an interlocking arrangement the moulding dies 20A and 20B respectively.

Figure 3:
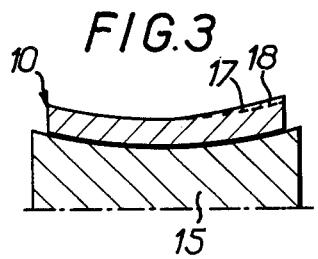
Figure 7:
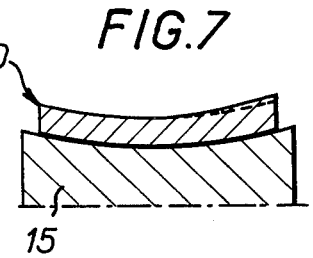
Figure 13:
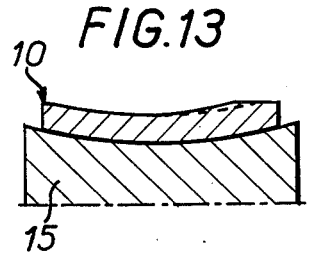
Figure 8:

According to the invention, the moulding die 20A which has a concave moulding face is produced by application of the process described with reference to FIGS. 1 to 3, and its concave moulding face therefore has a progressive surface.

According to a development of the invention, the spacer lip 23 of the seal 21 is shaped so as to fit exactly the moulding face of each of the moulding dies 20A, 20B, as illustrated in FIG. 4.

This has the result that the die 20A does not need to have a flat or slightly sperical jont surface adapted to serve as a special support of the spacer lip 23 of the seal 21. Consequently the lens of organic glass moulded between the moulding dies 20A, 20B can be used at full aperture.

The moulding technique is well known per se and will not be described here. It will be sufficient to recall that it consists in placing in position between the dies 20A, 20B a suitable polymerisable organic material, such as that sold under the commercial designation CR39, and effecting the polymerisation of this material by heating.

Because of the shrinkage of this material which usually occurs when it is polymerised, it is advantageous for the moulding dies 20A, 20B to be able to follow this shrinkage elastically and for them consequently to have suitable thicknesses, for example between 1 and 10 mm, although these values are in no way limitative.

On the other hand, in order to ensure that the thermal sagging of the original blank 10 takes place under good conditions in accordance with the process described above, it may be advantageous for the thickness of this blank to be greater than that corresponding strictly to suitable elasticity, and that it should for example be between 3 and 15 mm.

According to the invention, therefore, provision is made for optionally regrinding the moulding die obtained from a blank of this kind, for the purpose of reducing its thickness after being heated on the shaping block 15.

For example, it is possible to start with a blank 10 having a thickness of 7 mm at the centre, an apertuure diameter of 71 mm, a concave face radius R1 of 88 mm, and a reference sphere radius R2 of 87 mm, this blank being placed on a shaping block 15 having a spherical support surface 16 with a radius R3 of 86 mm, while after the thermal sagging of this blank its convex face may be reground so as to reduce its thickness at the center to about 5 mm.

The moulding die obtained, optionally after undergoing treatment adapted to impart greater elasticity to it, for example thermal or chemical tempering, can then be used for moulding an ophthalmic lens of organic glass.

It is obvious that the numerical values given above have been given only by way of example and should not in any way be considered as a limitation on the invention.

On the contrary, these values may vary within wide limits, no value being in itself critical, particularly as regards the original thickness of the blank within the range from 3 to 15 mm give above, and/or in respect of the thickness of the moulding die produced therefrom, within the range of from 1 to 10 mm which is likewise given above.

In the alternative embodiment illustrated in FIGS. 5 to 9 the moulding die 20A obtained after the thermal sagging of the blank 10 has on its periphery a substantially flat or slightly spherical seal bearing portion or joint surface 25 (FIG. 8) for the application, during the subsequent moulding of an ophthalmic lens of organic glass, of a seal 21 provided in conventional manner with a spacer lip 23 bounded on its coresponding transverse surface by a substantially flat or slightly spherical surface.

It is obvious that the formation of the joint surface 25 on the moulding die 20A leads to the presence on the corresponding concave face of the latter of a ridge 26 which, not being circular because of the progressive surface provided on this concave face, limits the useful aperture of the ophthalmic lens subsequently obtained.

In the alternative embodiment illustrated in FIGS. 10 to 14, the joint surface 25 is formed on the blank 10 before the thermal sagging of the latter (FIG. 11), so that after such a subsidence this jont surface is limited and it is possible to use a seal 21 whose peripheral lip 23 exactly matches the moulding faces of the moulding dies 20A, 20B (FIG. 14), and thus to obtain once again ophthalmic lenses which can be used at full aperture.

The present invention is obviously not limited to the embodiments described and illustrated, but includes any alternative embodiments. Furthermore, as will have been understood, the word "blank" applies hereinabove both to a glass disc which has simply undergone rough grinding on both its faces and to a glass disc of which at least one face has undergone finer machining, for example fine grinding and even polishing.

I claim:
1. A method of producing a curved glass die having an aspherical polished concave face, comprising the steps of:
   providing a curved die blank having a polished spherical concave face and an at least rough ground aspherical convex face which is complementary to the desired concave face of the blank;
   placing the convex face of the blank of a shaping block of refractory material having a spherical concave support surface; and
   heating the blank and the shaping block at a sufficient temperature to enable the glass of the blank to deform without flowing until the convex face of the blank rests on said concave support surface and conforms to the spherical shape of said concave support surface, thereby transferring to the polished concave face of the blank the curve that was initially on the convex face of the blank.

2. A method according to claim 1, further comprising providing at the periphery of the die blank a flat or spherical seal bearing portion.

3. A method according to claim 2, wherein the flat or spherical seal bearing portion is on the concave face of the die blank, before the heating step.

4. A method according to claim 2, wherein the flat or spherical seal bearing portion is on the convex face of the die blank before the heating step.

5. A method according to claim 1, wherein the thickness of the blank is reduced after the heating step.

6. A method according to claim 5, wherein the original thickness of the blank is between 3 and 15 mm and the thickness after heating is reduced to between 1 and 10 mm.

* * * * *